Dec. 28, 1926.                                                          1,611,985
J. ATWELL
POWER DRIVEN SAW USED FOR FELLING AND CUTTING TREES
Filed July 7, 1925          3 Sheets-Sheet 1
Fig. 1.
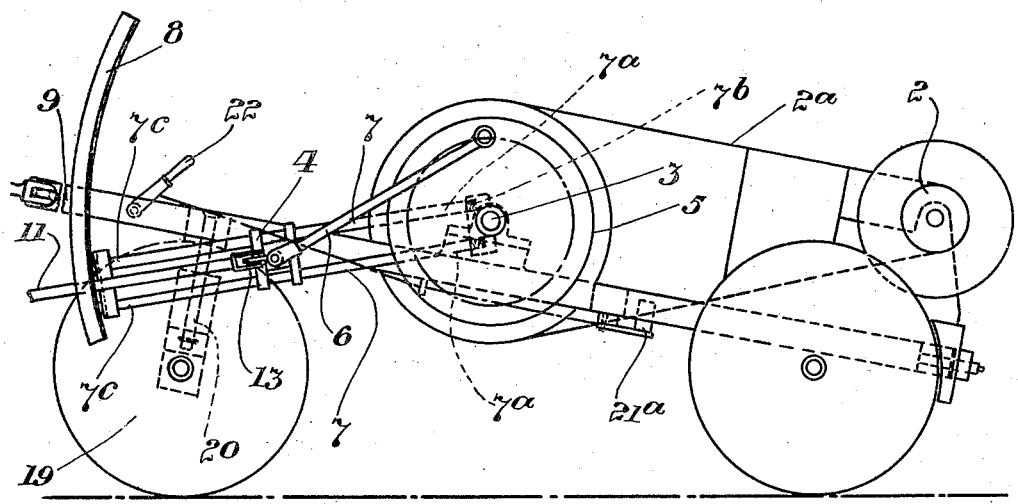
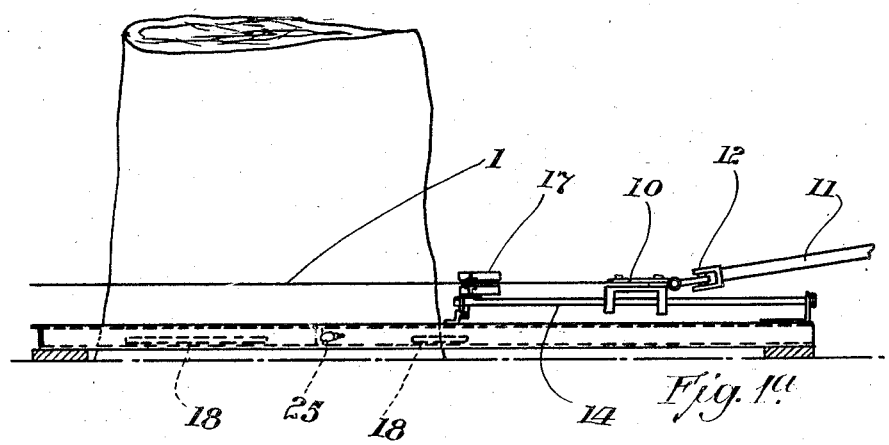
Fig. 1a.
Inventor
J. Atwell Dec. 28, 1926.                                                                          1,611,985
                              J. ATWELL
             POWER DRIVEN SAW USED FOR FELLING AND CUTTING TREES
                    Filed July 7, 1925        3 Sheets-Sheet 2

Inventor
J. Atwell

Dec. 28, 1926.　　　　　　　　　　　　　　　　1,611,985
J. ATWELL
POWER DRIVEN SAW USED FOR FELLING AND CUTTING TREES
Filed July 7, 1925　　　3 Sheets-Sheet 3
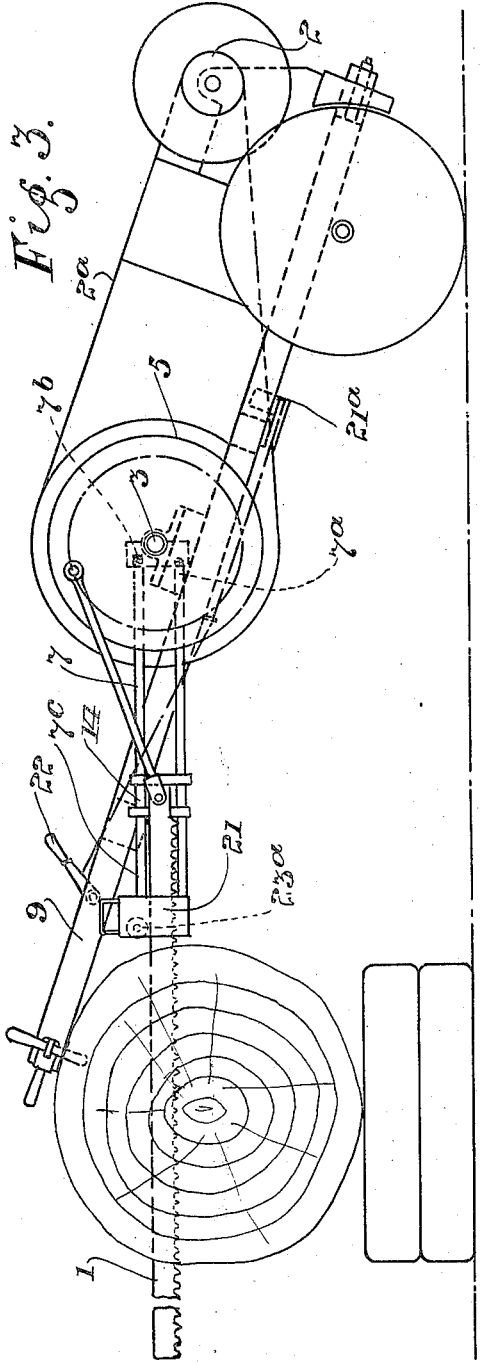
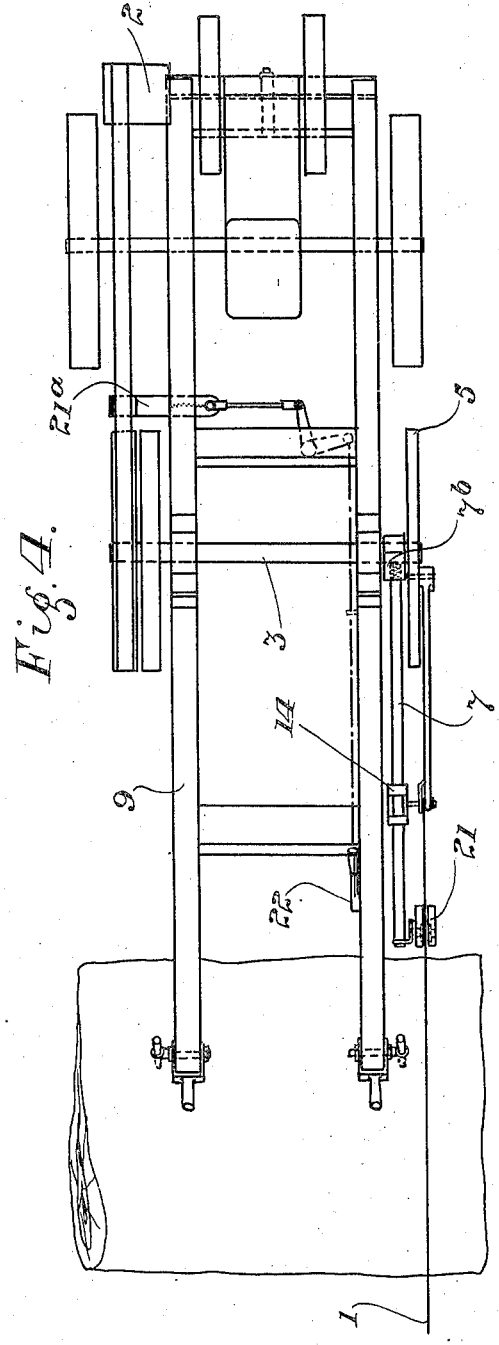
Inventor
J. Atwell Patented Dec. 28, 1926.

1,611,985

UNITED STATES PATENT OFFICE.

JOHN ATWELL, OF DUNGANNON, IRELAND, ASSIGNOR OF ONE-FOURTH TO DAVID BROWN, OF DONAGHMORE, IRELAND, AND ONE-FOURTH TO ALEXANDER CUTHBERT, OF CARRICKFERGUS, IRELAND.

POWER-DRIVEN SAW USED FOR FELLING AND CUTTING TREES.

Application filed July 7, 1925, Serial No. 42,105, and in Great Britain July 9, 1924.

This invention relates to power driven sawing machines for felling and cutting trees, in which a crosshead slidable in guide rods is reciprocated by a connecting rod driven from a crank on a driving shaft to operate a saw blade, and has for its object to provide improvements therein.

According to this invention a sawing machine of the kind above specified is characterized by means connecting the saw blade to the crosshead whereby the saw blade may be operated at any level, in any straight line, and at any angle to the horizontal both along and across the blade within certain limits, without the necessity of altering the position of the driving mechanism. Independent means for guiding the saw blade and securing it to its work are also provided and the saw blade is also preferably adapted to be used for sawing in either direction without moving the driving unit.

In order that the invention may be clearly understood we have hereunto appended explanatory sheets of drawings showing a tree felling and cross cutting saw in accordance with the invetnion.

Figs. 1 and 1ª together are an elevation showing the saw in position for felling a tree.

Figs. 2 and 2ª together are a plan view corresponding to Fig. 1.

Fig. 3 is an elevation showing the saw in the act of cross cutting a tree.

Fig. 4 is a plan view corresponding to Fig. 3.

Referring to the drawings:—

Figure 2:
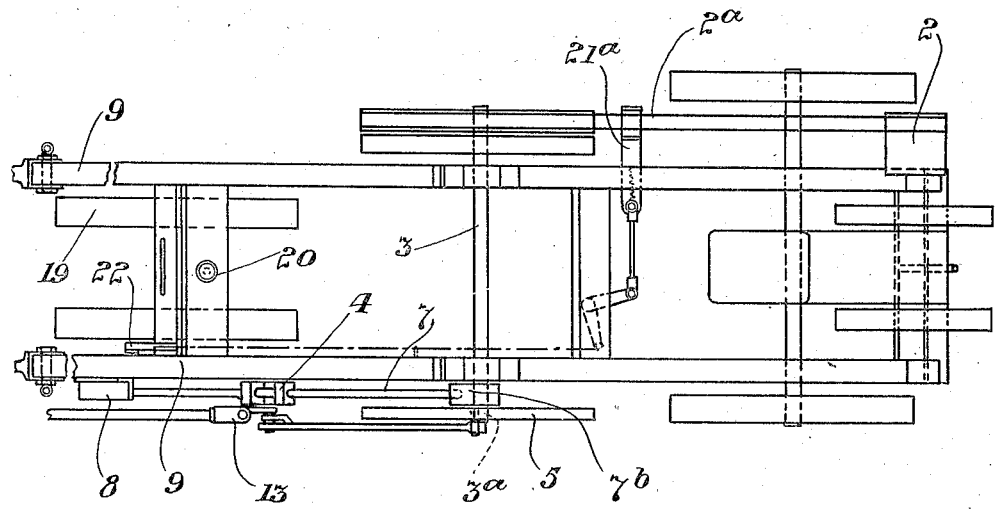
Figure 2A:
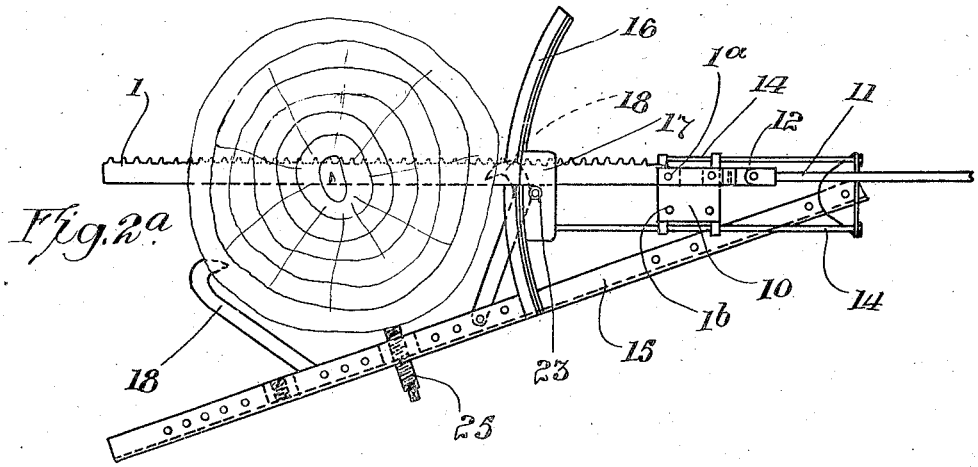

The power driven saw 1 shown in the drawings, is operated from a driving unit 2 which, operating through fast and loose driving pulleys on a counter-shaft 3 effects the reciprocation of the saw operating crosshead 4 through the medium of a crank disc 5 on the shaft 3 and a crank connecting rod 6. The bars 7 on which the crosshead 4 operates are turnably supported at their ends 7ª being connected with a bearing block 7ᵇ turnable on the end 3ª of the shaft 3 whilst the ends 7ᶜ of the rods are supported on an arc shaped member 8 secured to the body framework 9 forming the wheeled carriage for the saw and its driving unit. The angle of the bars 7 relative to the horizontal or ground line and consequently the angle of the path of reciprocation of the crosshead 4 can be varied by adjusting the ends 7ᶜ of the bars 7 on the arc shaped support 8, bolts or other means being provided for securing the ends of the rods 7 to the member 8 at the required position. The connection between the crosshead 4 and a sliding block 10 to which the saw 1 is attached is effected by means of a connecting rod 11. The connecting rod 11 is connected with the block 10 and with the crosshead 4 by means of universal joints at 12 and 13. The sliding block 10 to which the saw is attached works on guide rods 14 which are pivotally connected at their back ends with a carrier bar 15 which supports an arc shaped bar 16 on which a roller block 17 is movable, said block 17 being connected to the front ends of the rods 14 on which the sliding block 10 is slidably supported. In the example shown at Figs. 1, 1ª, 2, 2ª the saw is being used for felling a tree and the bar 15 for the sliding rods 14 and saw carrying sliding block 10, etc., is attached to the tree by means of dog hooks 18 pivotally connected with the carrying bar 15. The carriage 9 which supports the sliding rods 7 and the arc shaped guiding member 8 is, in the example shown at Figs. 1, 1ª, 2, 2ª, shown with a front supporting carriage 19 on which the framework 9 is turnably supported at the front; turning of the wheeled carriage 19 being effected through the medium of the pin 20.

The wheeled carriage 19 is removed when the saw is to be used for cross cutting as shown at Figs. 3 and 4. For cross cutting purposes the saw is connected directly with the crosshead 4 which slides on the slide rods 7. The arc shaped guide member 8 is dispensed with and the saw works in or through a guide block 21.

The blocks 17 and 21 for the saw to work in are each provided with anti-friction members, for example, the roller 23 in the case of the block 17 and the roller 23ª in the case of the block 21. The roller 23 is shown at the centre of the block 17, slots being provided in the block at each side of said roller for the saw to work through with its back bearing against the roller 23. This arrangement permits of the saw being used either from left to right as shown, or from right to left if desired without changing the position of the power unit or driving means. If the saw is to be used so that it will move laterally in the opposite direction to that shown at Figs. 2 and 2ª, the back end of the saw would be changed from its connection at 1ª to the position 1ᵇ and if necessary the connecting rod 11 could also be changed to the opposite side of the block 10. The saw 1 is shown in Figs. 1, 1ª, 2, 2ª so that it operates horizontally through the tree but by rearranging the carrier member 15 it could readily be adapted to work vertically or at any other angle through a tree or through a branch of a tree, if required.

A screw threaded member 25 passing through the bar 15 is adapted to be screwed against the work to cause the dog hooks to sink into and grip the timber.

The saw blade is fed on to its work by pushing on the roller block 17 with the hand. In cutting felled logs, the weight of the machine is sufficient to feed the blade forward.

Control of the operation of the saw is effected, in the example shown by belt forks capable of moving the driving belt 2ª from the fast to the loose pulley or vice versa. Control of the belt fork 21ª is effected by means of the handle 22 through suitable connections as shown.

Having now fully described my invention what I claim and desire to secure by Letters Patent is:—

1. A power driven sawing machine comprising, means for driving the saw; a crosshead reciprocated by said driving means; guides for said crosshead; a carrying bar; guide members pivoted at one end to said carrying bar; a block slidably mounted on said guides and adapted to hold the saw blade and means for connecting the said crosshead to said block so as to operate the saw in a number of different levels or angular positions, without altering the position of the driving mechanism.

2. A power driven sawing machine comprising, means for driving the saw; a crosshead reciprocated by said driving means; guides for said crosshead; a carrying bar; guide members pivoted at one end to said carrying bar; a block slidably mounted on said guides and adapted to hold the saw blade; an anti-friction device on said guide rods adapted to support the saw blade and means for connecting said crosshead to said block so as to operate the saw in a number of different levels or angular positions, without altering the position of the driving mechanism.

3. A power driven sawing machine comprising, means for driving the saw; a crosshead reciprocated by said driving means; guides for said crosshead; a carrying bar; means for securing the carrying bar to the work; guide members pivoted at one end to said carrying bar; a block slidably mounted on said guides and adapted to hold the saw blade and means for connecting said crosshead to said block so as to operate the saw in a number of different levels or angular positions, without altering the position of the driving mechanism.

4. A power driven sawing machine comprising, means for driving the saw; a crosshead reciprocated by said driving means; guides for said crosshead; a carrying bar; dog hooks pivotally mounted on said carrying bar adapted to grip the work; a screwed member on said carrying bar adapted to force said hooks into the work; guide members pivoted at one end to said carrying bar; a block slidably mounted on said guides and adapted to hold the saw blade and means for connecting said crosshead to said block so as to operate the saw in a number of different levels or angular positions, without altering the position of the driving mechanism.

5. A power driven sawing machine comprising, means for driving the saw; a crosshead reciprocated by said driving means; guides for said crosshead; a carrying bar; guide members pivoted at one end to said carrying bar; means on said guides adapted to support the saw blade; a block slidably mounted on said guides and adapted to hold the saw blade; means on said block whereby the saw blade is secured thereto in position in which it is capable of cutting away from as well as towards the carrying bar and means for connecting said crosshead to said block so as to operate the saw in a number of different levels or angular positions, without altering the position of the driving mechanism.

In testimony whereof I affix my signature.

JOHN ATWELL.